(12) United States Patent
Kingma

(10) Patent No.: US 10,310,593 B2
(45) Date of Patent: Jun. 4, 2019

(54) ELECTRONIC MOBILE DEVICE

(71) Applicant: KONINKLIJKE PHILIPS N.V., Eindhoven (NL)

(72) Inventor: Harm Kingma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 51 days.

(21) Appl. No.: 15/560,302

(22) PCT Filed: Feb. 24, 2016

(86) PCT No.: PCT/EP2016/053866
§ 371 (c)(1),
(2) Date: Sep. 21, 2017

(87) PCT Pub. No.: WO2016/155950
PCT Pub. Date: Oct. 6, 2016

(65) Prior Publication Data
US 2018/0059770 A1    Mar. 1, 2018

(30) Foreign Application Priority Data

Apr. 1, 2015  (EP) ..................................... 15162195

(51) Int. Cl.
*G06F 1/32*  (2019.01)
*G06F 1/3296* (2019.01)
(Continued)

(52) U.S. Cl.
CPC ............ *G06F 1/3296* (2013.01); *G01P 13/00* (2013.01); *G06F 1/3215* (2013.01);
(Continued)

(58) Field of Classification Search
CPC ....... G06F 1/3231; G06F 3/0346; G01P 13/00
See application file for complete search history.

(56) References Cited

U.S. PATENT DOCUMENTS 5,615,132 A * 3/1997 Horton .................... G06F 3/011
340/988
2009/0195497 A1  8/2009 Fitzgerald
(Continued)

FOREIGN PATENT DOCUMENTS

EP         2703778 A1    3/2014
EP         2703779 A1    3/2014
(Continued)

*Primary Examiner* — Albert Wang

(57) ABSTRACT

The invention relates to an electronic mobile device (10; 20) comprising a device mode control unit (5) arranged to switch the mobile device from a first operational mode into a second operational mode. An orientation sensor (18; 28) is configured to measure a current orientation of the mobile device. A processor (6) periodically receives the current orientation from the orientation sensor, periodically stores the received current orientation as a reference orientation, and periodically calculates a differential angle between the current orientation and the stored reference orientation. The device is switched from the first operational mode to the second operational mode if the differential angle is above a predefined angular threshold value. A frequency of said periodically receiving and periodically storing the current orientation as the reference orientation is lower than a frequency of said periodically receiving the current orientation, periodically calculating and periodically comparing the differential angle.

15 Claims, 6 Drawing Sheets

(51) Int. Cl.
  *G01P 13/00*   (2006.01)
  *G06F 1/3215*  (2019.01)
  *G06F 3/0346*  (2013.01)
  *G06F 1/3231*  (2019.01)
  *B26B 19/38*   (2006.01)
  *G01P 15/18*   (2013.01)

(52) U.S. Cl.
  CPC .......... *G06F 1/3231* (2013.01); *G06F 3/0346* (2013.01); *B26B 19/388* (2013.01); *G01P 15/18* (2013.01); *G06F 2200/1637* (2013.01)

(56) References Cited

U.S. PATENT DOCUMENTS

| | | |
|---|---|---|
| 2011/0254760 A1 | 10/2011 | Lloyd |
| 2012/0254646 A1 | 10/2012 | Lin |
| 2013/0002565 A1 | 1/2013 | Tumanov |
| 2014/0067305 A1* | 3/2014 | Oliver .................... G01B 21/16 |
| | | 702/92 |

FOREIGN PATENT DOCUMENTS

| | | |
|---|---|---|
| WO | 2005093550 A2 | 10/2005 |
| WO | 2009068648 A1 | 6/2009 |
| WO | 2010042661 A2 | 4/2010 |
| WO | 2012158439 A1 | 11/2012 |
| WO | 2013096572 A1 | 6/2013 |
| WO | 2015042048 A2 | 3/2015 |

* cited by examiner

ELECTRONIC MOBILE DEVICE

This application is the U.S. National Phase application under 35 U.S.C. § 371 of International Application No. PCT/EP2016/053866, filed on Feb. 24, 2016, which claims the benefit of International Application No. 15162195.0 filed on Apr. 1, 2015. These applications are hereby incorporated by reference herein.

FIELD OF THE INVENTION

The invention relates to electronic mobile devices, such as mobile phones and personal care devices such as electric shavers. The invention more particularly relates to an electronic mobile device which can be switched from a first operational mode into a second operational mode. The invention also relates to a method of switching an electronic mobile device from a first operational mode into a second operational mode and vice versa. Finally, the invention also relates to a computer program product.

BACKGROUND OF THE INVENTION

To power electronic mobile devices, such as mobile communication devices and personal care devices like shavers, rechargeable batteries are used. To save energy, modern electronic mobile devices are automatically switched into a low-energy mode, sometimes referred to as sleep mode. To wake up the electronic mobile device from the sleep mode, different techniques are used. In case the electronic mobile device comprises a mechanical on/off switch, the device may be woken up by pressing the mechanical switch. Today this method is used by the majority of electronic mobile devices. A well known example is the smartphone.

When using a mechanical switch, the device will not wake up until the user presses the switch. This means the device is not able to respond to the act of picking up the device. Taking into account the fact that the act of picking up a device usually means the user wants to use it, this can be considered to be a disadvantage.

To overcome this issue, the electronic mobile device may have a mechanical motion sensor incorporated in it. The device will then be woken up when the mechanical motion sensor generates a pulse train which meets a predetermined wake-up requirement, e.g. a minimum/maximum duration and frequency. A wake-on-pickup function can be achieved with this approach. In this case it is possible to wake the device by picking it up. However, the device will also be prone to wake up due to random vibrations and shocks, which is undesirable. An existing solution to this problem is to disable the motion sensor for a while when the device has woken up a predefined number of times without user interaction. However, this means the device will be completely unresponsive to motion during that time. Also, in order to ensure that the device remains operable under all circumstances, an alternative method for waking/activating the device needs to be implemented, for example adding a mechanical switch. This leads to additional costs, complexity and less intuitive device operation.

Alternatively, the electronic mobile device may use a capacitive touch sensor. The mobile device can then be woken up when the user touches e.g. a screen or window of the device comprising the capacitive touch sensor. Like in the above implementation of using a mechanical switch, the device will not wake up until the user touches the sensor. This means the device is not able to respond to the act of picking up the device.

A further alternative is the use of an accelerometer within the electronic mobile device. The device will be woken up when a measured acceleration along at least one of the axes of the accelerometer exceeds a threshold (e.g. by shaking, turning or picking up the device with sufficient speed) or when the device is held in a specific orientation. However, when waking up a mobile device based on acceleration exceeding a certain threshold, the device will not always wake up when needed. For example when the device is picked up very (too) slowly, or when the device is not held in the correct orientation.

Patent application WO 2010/042661 discloses a method and system for waking up an electronic mobile device due to motion. The device comprises an accelerometer configured to register a motion of the device. A computation logic analyzes the motion data to determine if the motion data indicates a real motion. If so, the device is woken up. The device comprises a long average logic configured to calculate a long average of accelerations over a sample period along a so-called dominant axis. The sample period may be 5 minutes. The long average logic adds the sampled motion data to a long average value to create an updated long average value of accelerations. The computation logic compares the idle dominant axis with the current dominant axis. If the dominant axis has changed, then the orientation of the device has changed, and that warrants waking up the device. If the dominant axis is substantially the same as the idle dominant axis, then the computation logic determines whether the long average value along the dominant axis has changed by more than a threshold value. If the long average value has changed more than the threshold value, the device is woken up.

A disadvantage of the electronic mobile device described above is that accelerations are very sensitive to shocks and other abnormalities. So, it is necessary to compensate for glitches. In the electronic mobile device known from WO 2010/042661, this compensation is done by adding additional logic such as a glitch correction logic. This will increase the complexity and costs of the device. Furthermore, the use of a long average of accelerations requires additional hardware such as a ring buffer memory, and results in an unwanted additional amount of data processing.

WO 2009/068648 A1 discloses a portable electronic apparatus having first and second display areas. The apparatus has an orientation sensor, that measures a spatial orientation of the apparatus, and a display controller coupled to the orientation sensor. The display controller switches the first and second display areas between a first and a second display state, for example between on and off states, depending on the orientation of the apparatus measured by the orientation sensor. The display controller periodically calculates a movement of the apparatus as the difference between a current orientation measured by the orientation sensor and a previous orientation stored in a memory. If the calculated movement is below a threshold, the display controller does not switch the display areas. If the calculated movement exceeds the threshold, the display controller draws a conclusion about whether or not to switch the display areas based on an analysis of the calculated movement. In case the display controller switches the display areas, the previous orientation in the memory is replaced by the current orientation.

EP 2 703 778 A1 discloses a portable electronic device comprising a display screen which toggles between landscape and portrait orientations based on the orientation of the device. The orientation of the device is determined by a combination of different sensors, i.e. a gyroscope, an accelerometer and a magnetometer. The gyroscope is configured to sense rotational velocity of the device. The device determines a current orientation of the device based on a past reference orientation, stored in a temporary storage, and the rotational velocity measurements of the gyroscope. The past reference orientation is calculated using the measurements of the accelerometer and the magnetometer. The measurements of the accelerometer and the magnetometer are periodically collected in order to provide a corrected reference orientation from which the current orientation of the device can be calculated based on the gyroscope measurements. The periodic correction of the reference orientation is performed in order to limit the drift caused by errors in the gyroscope measurements.

SUMMARY OF THE INVENTION

It is an object of the invention to provide an electronic mobile device which is able to automatically switch between two operating modes, using a control system which is less sensitive to shocks and which uses less processing power as compared to devices of the state of the art.

To achieve this object, according to an aspect of the present invention, there is provided an electronic mobile device comprising a device mode control unit configured and arranged to switch the mobile device from a first operational mode into a second operational mode and vice versa, an orientation sensor configured and arranged to measure a current orientation of the mobile device, and a processor. The processor is configured and arranged such that, during operation of the mobile device, the processor:

receives the current orientation from the orientation sensor and stores the received current orientation as a reference orientation of the mobile device,
  periodically receives the current orientation from the orientation sensor, periodically calculates a differential angle between the current orientation and the stored reference orientation, and periodically compares the differential angle with a predefined angular threshold value, and
  instructs the device mode control unit to switch the mobile device from the first operational mode to the second operational mode if the differential angle is above the predefined angular threshold value, wherein the processor is configured and arranged such that, during operation of the mobile device, the processor periodically receives the current orientation from the orientation sensor and periodically stores the received current orientation as the reference orientation with a frequency which is lower than a frequency of said periodically receiving the current orientation, periodically calculating and periodically comparing the differential angle.

By using the orientation of the device instead of the acceleration, there is no sensitivity to abnormality of the sensors or to sudden accelerations of the device when determining whether the device needs to be switched from the first to the second operational mode. Furthermore, because the frequency of said periodically receiving and periodically storing the current orientation as the reference orientation is lower than the frequency of said periodically receiving the current orientation, periodically calculating and periodically comparing the differential angle, the stored reference orientation will be compensated for slow changes of the orientation of the device that may occur in the first operational mode, so that the device will also be reliably switched from the first to the second operational mode if the orientation of the device has slowly changed during the first operational mode.

In the present invention, the expression "periodically" is used to indicate that said receiving of the current orientation from the orientation sensor, said calculating of the differential angle between the current orientation and the stored reference orientation, and said comparing of the differential angle with the predefined angular threshold value are performed with a predefined frequency, and to indicate that said receiving of the current orientation from the orientation sensor and said storing of the received current orientation as the reference orientation are also performed with a predefined frequency. Said frequencies may be fixed frequencies, but this is not required. It is essential that the frequencies are predefined, i.e. the frequencies are defined for example as operating parameters programmed in the processor.

In an embodiment, the first operational mode is a low-power mode and the second operational mode is a high-power mode.

A user can wake up the electronic mobile device according to the invention by simply picking it up. There is no need to press any button or touch a touch-sensitive screen. Since the measured current orientation relative to the stored reference orientation usually changes substantially whenever the device is picked up, the orientation sensor will measure a changing orientation. A differential angle between the measured current orientation and the stored reference orientation is calculated. When the differential angle exceeds the predefined angular threshold value, the processor concludes that the device is picked up and that the user wants to use the device. The previously stored orientation is referred to as the reference orientation. The measured current orientation is periodically stored as a new reference orientation with a frequency such that the user experience is optimized. The frequency is chosen such that the device will not wake up when only small changes of the orientation occur during slow movements of the device.

The periodical storing of the new reference orientation also assures that the reference orientation follows the orientation changes when the device is used in the high-power mode. If this periodical storing were not done, the device might wake up immediately upon entry in the sleep mode depending on the last measured reference orientation compared to the current orientation.

In an embodiment, the frequency of said periodically receiving and periodically storing the current orientation as the reference orientation is in a range from 0.25 to 0.5 Hz. These values for the frequency of updating the reference orientation were found to give a good user experience with a mobile electronic device such as an electric shaver or a mobile communication device.

In an embodiment, the processor is configured and arranged such that, during operation of the mobile device, the processor stores the received current orientation as the reference orientation when the mobile device is switched from the first operational mode to the second operational mode. In this way, when switching from the first to the second operational mode, the reference orientation is updated independently of the frequency of the periodic update of the reference orientation, and the reference orientation is updated immediately when the device is switched to the second operational mode.

In an embodiment, the processor is configured and arranged such that, in the low-power mode of the mobile device, the processor distinguishes between a sleep mode and a travel mode, wherein, if the mobile device is switched from the sleep mode to the high-power mode a predefined number of times during a predefined time period without registering any user interaction, the processor instructs the device mode control unit to switch the mobile device into the travel mode. In the sleep mode, the predefined angular threshold may be smaller than in the travel mode. This provides an advantage, because it prevents the device from waking up during travelling.

The predefined angular threshold value may be in a range from 10 to 15 degrees or in a range from 60 to 65 degrees. Other values and ranges are possible. The range of 10 to 15 degrees is very suitable for waking up the device if the device is in the sleep mode. The range of 60 to 65 degrees may be used to wake up the device, but not as readily as in the sleep mode. For example, if the device is in travel mode, the range of 60 to 65 degrees is preferred, because it allows the device to stay in low-power mode even when it is moved due to usual movements of a suitcase that is used to store the device. In that case, a higher predefined angular threshold is preferred.

In an embodiment, the processor instructs the device mode control unit to switch the mobile device from the travel mode into the sleep mode if the mobile device has been in travel mode a predefined maximum travel time.

In an embodiment, the orientation sensor comprises a 3-axis accelerometer. In another embodiment, the orientation sensor comprises a 3-axis magnetometer. It is noted that any other type of sensor configured to measure the orientation of the device with respect to the earth's gravitational field could be used.

In yet another embodiment, the orientation sensor comprises a 3-axis gyroscope configured and arranged to measure an angular rate along 3 axes. In this embodiment, the processor may be configured and arranged such that, during operation of the mobile device, the processor switches a sample rate of the orientation sensor between a relatively low sample rate and a relatively high sample rate, wherein the processor switches the sample rate to the relatively low sample rate if a measured angular rate on at least one of the 3 axes is lower than a minimum angular rate threshold, and wherein the processor switches the sample rate to the relatively high sample rate if the measured angular rate on at least one of the 3 axes is higher than the minimum angular rate threshold.

The electronic mobile device mentioned above may be a personal care device, a mobile communication device, a mobile media player, a phablet or a mobile computing device.

According to a further aspect, the invention provides a method of switching an electronic mobile device from a first operational mode into a second operational mode and vice versa. The method comprises:
receiving a current orientation of the mobile device from an orientation sensor of the mobile device and storing the received current orientation as a reference orientation of the device;
periodically receiving the current orientation from the orientation sensor, periodically calculating a differential angle between the current orientation and the stored reference orientation, and periodically comparing the differential angle with a predefined angular threshold value; and
switching the mobile device from the first operational mode to the second operational mode if the differential angle is above the predefined angular threshold value, wherein the method comprises periodically receiving the current orientation of the mobile device from the orientation sensor and periodically storing the current orientation as the reference orientation with a frequency which is lower than a frequency of said periodically receiving the current orientation, periodically calculating and periodically comparing the differential angle.

According to a further aspect, the invention provides a computer program product comprising instructions for causing a processor system to perform a method according to the invention as mentioned above.

Further preferred embodiments of the electronic mobile device and the method of switching an electronic mobile device according to the invention are given in the appended claims.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF THE EMBODIMENTS

Figure 1:
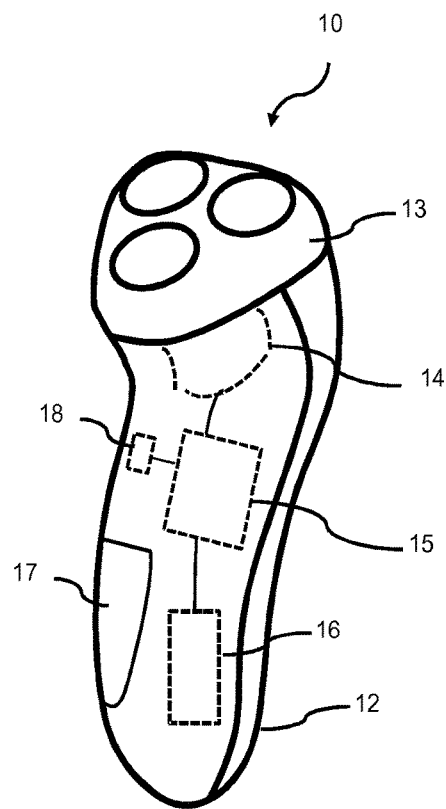
FIG. 1 schematically shows a perspective view of an embodiment of an electronic mobile device according to the invention, FIG. 2 schematically shows a perspective view of a further embodiment of an electronic mobile device according to the invention, FIG. 3 schematically shows a processor, a battery and an orientation sensor of an electronic mobile device according to the invention.

FIG. 1 schematically shows a perspective view of an electronic mobile device according to an embodiment of the invention. In this example, the device is an electric shaver 10. The shaver 10 comprises a housing 12 and a cutter unit 13. Inside the housing 12, an electric motor 14 is located which is arranged to drive the cutter unit 13. The shaver 10 further comprises a processor 15, a rechargeable battery 16, a user interface 17 and an orientation sensor 18. The processor 15 is arranged to receive input from the user interface 17 and from the orientation sensor 18. The motor 14, the processor 15 and the user interface 17 are powered by the rechargeable battery 16. The user interface 17 may comprise a touchscreen for input by a user.

Figure 2:
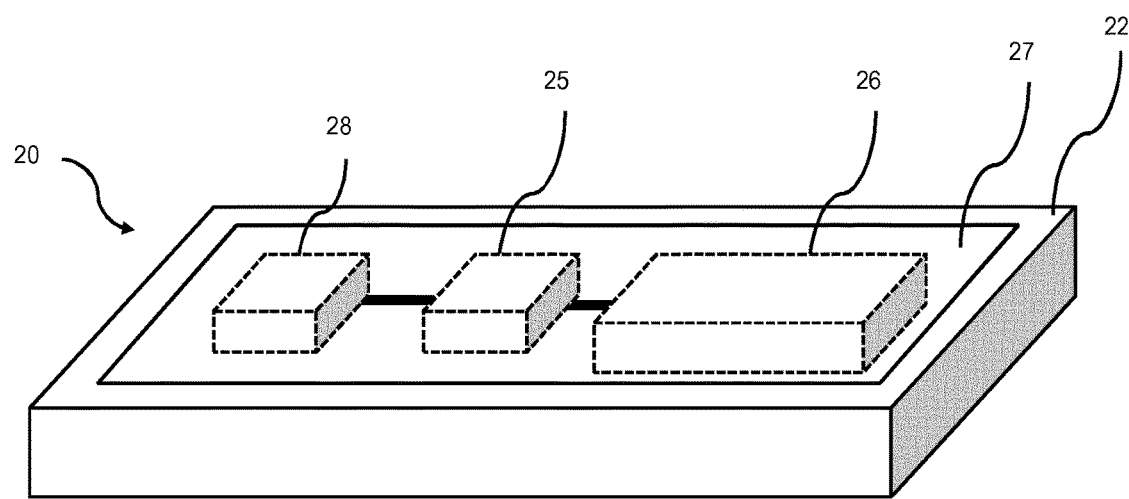

FIG. 2 schematically shows a perspective view of an electronic mobile device according to a further embodiment of the invention. In this example, the device is a mobile phone 20. The mobile phone 20 comprises a housing 22 and a user interface 27. Inside the housing 22, behind the user interface 27, a processor 25 and a rechargeable battery 26 are arranged. The mobile phone further comprises an orientation sensor 28. Please note that in FIG. 2, the user interface 27 is made transparent so that the processor 25, the rechargeable battery 26 and the orientation sensor 28 are visible.

The processor 25 is arranged to receive input from the user interface 27 and from the orientation sensor 28. The processor 25 and the user interface 27 are powered by the rechargeable battery 26. The user interface 27 may comprise a touchscreen for input by a user. As will be clear to the skilled person, the mobile phone 20 may further comprise an antenna, a transmitter, a receiver, a memory for storing data, etcetera.

Figure 3:
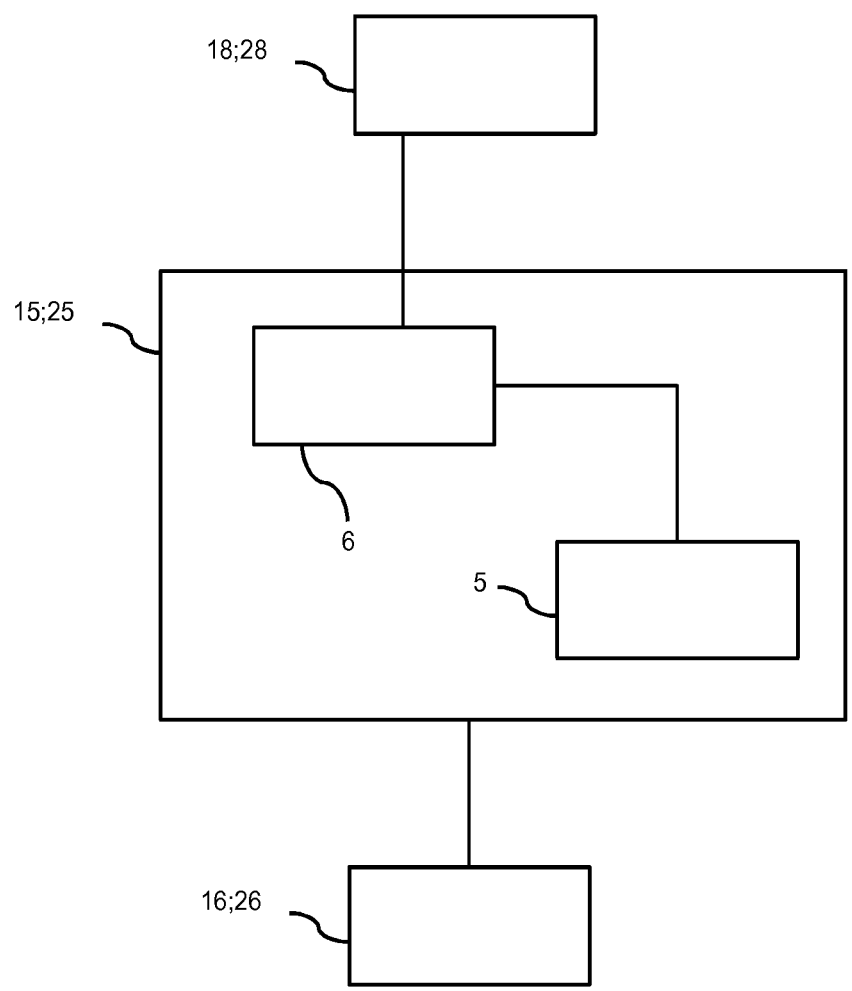

FIG. 3 schematically shows the processor 15, 25, the battery 16, 26 and the orientation sensor 18, 28 according to an embodiment. In order to save battery, the electronic mobile device 10, 20 comprises a device mode control unit 5 arranged to switch the device 10, 20 from a low-power mode into a high-power mode and vice versa. The switching between the low-power mode and the high-power mode will depend on an orientation change of the device 10, 20 measured by the orientation sensor 18, 28 present in the device 10, 20. The orientation sensor 18, 28 is arranged to repeatedly determine a current orientation of the device 10, 20. For example, the orientation sensor 18, 28 may be an accelerometer producing measurement values every 100 msec.

The electronic mobile device 10, 20 may further comprise a processor 6 arranged to receive the current orientation from the orientation sensor 18, 28. The processor 6 periodically stores the measured current orientation as a new reference orientation, and periodically calculates a differential angle between the current orientation and the stored reference orientation. If the differential angle is above a predefined angular threshold value, the processor 6 instructs the device mode control unit 5 to switch the device from the low-power mode to the high-power mode, thereby 'waking up' the device.

Preferably, a wake-up function is capable of waking up the device whenever the user picks it up, while simultaneously preventing the device from waking in other circumstances. By waking up the device based on changes in its orientation, the device will wake up no matter what the current reference orientation is (e.g. upside down, on a side, face up, somewhere in between).

The decision to wake the device or not is made by determining if the differential angle exceeds the predefined angular threshold value or not. In practice, when the user picks up the device, the orientation will always change somewhat. Therefore, by setting the predefined angular threshold to a low value (e.g. 10 to 15 degrees), one can make sure that the device wakes when it is picked up normally. Care should be taken not to make this angular threshold too small in order to avoid that the device will wake up due to small shocks or vibrations. When the device is woken up, the measured current orientation is stored as the new reference orientation.

The processor 6 periodically receives the current orientation from the orientation sensor 18, 28, calculates a differential angle between the current orientation and the stored reference orientation, and compares the differential angle with a predefined angular threshold value. The frequency of said periodically receiving the current orientation and calculating and comparing the differential angle may be in a range between 5-15 Hz, preferably about 10 Hz.

The measured current orientation is periodically stored as the new reference orientation. According to the invention, the frequency of said periodically receiving and storing the current orientation as the new reference orientation is lower than said frequency of said periodically receiving the current orientation from the orientation sensor, calculating the differential angle between the current orientation and the stored reference orientation, and comparing the differential angle with the predefined angular threshold value.

The frequency of said periodically receiving and storing the current orientation as the reference orientation may be in a range between 0.25 and 0.5 Hz. Raising this frequency would imply that the angular orientation changes need to be quicker in order to be detected. Lowering this frequency would imply that the device will become more susceptible to slow changes in orientation. Said periodic receiving and storing of the current orientation as the reference orientation is not only done when the device is awake (high-power mode) but also when it is in low-power mode.

There are several advantages involved in this periodic updating of the reference orientation. First of all, it is assured that the reference orientation matches the current orientation when the device lies in a stable position. Secondly, it is assured that the reference orientation is adapted to orientation changes when the device is awake. If this is not done, the device may wake up immediately after going into sleep mode, depending on the last measured reference orientation compared to the measured current orientation. Finally, in case the device orientation changes slowly in the sleep mode, the periodic updating of the reference orientation precludes the device from waking up as a result of relatively slow orientation changes that may occur, for example, when the device lies in a suitcase and slowly sinks between a stack of clothes.

In an embodiment, the processor 6 is arranged to subdivide the low-power mode into a sleep mode and a travel mode. With this embodiment, it is assumed that, if the device is woken up a predefined number of times in a predefined time period without any user interaction, the device is traveling. For example, the device may be stored in a suitcase which is moved during traveling, thereby sometimes causing displacement of the device such that its orientation is changed to such an extent that the predefined angular threshold is reached. In this embodiment, if the device is switched to the high-power mode a predefined number of times in a predefined time period without any user interaction being registered, the processor 6 switches the device into travel mode. Both the sleep mode and the travel mode are low-power modes, meaning that the device operates at a minimum level and is not able to receive user input via its user interface. However, in the sleep mode the predefined angular threshold value is smaller than in the travel mode. In the sleep mode the predefined angular threshold value may be in the range of 10 to 15 degrees, and in the travel mode the predefined angular threshold value may be in a range of 60 to 65 degrees.

By simply changing the minimum orientation angle change which triggers a wake up (i.e. the predefined angular threshold value), the orientation change sensitivity of the device can be altered. This mechanism is used to switch between sleep mode and travel mode. This approach allows the orientation sensor to remain active. Therefore, the device remains responsive at all times without the need for additional hardware like a mechanical switch. This reduces material costs and device complexity while at the same time resulting in a better user experience.

When the device is traveling, the differential angle will increase due to shaking and rolling as compared to a stable non-traveling state. Therefore, according to an embodiment, the predefined angular threshold value is increased when the device is switched to travel mode to ensure the device does not wake up unintentionally. On the other hand, the user still needs to be able to wake the device easily. A real world implementation shows that an angular threshold value of around 60 to 65 degrees is suitable for the travel mode. It ensures the device will remain in sleep mode in the majority of travel circumstances while still allowing the user to wake the device up via a bigger orientation change (e.g. roll/tilt). Only bigger changes, such as a suitcase being flipped on its side or violent shakes, will lead to a wake-up trigger. This is undesirable, of course, but also critical to ensure the user can still easily wake the device up (via a bigger angle change). A real world implementation shows that this approach results in acceptable wake-up behavior even though it takes some getting used to for some users.

As mentioned above, the device may be switched to travel mode automatically when it has been woken up a predefined number of times. In an embodiment, the processor 6 switches the device from travel mode into sleep mode if the device has been in travel mode a predefined maximum travel time. This will ensure maximum device responsiveness at all times. The values for the predefined maximum travel time and the predefined number of times may be tuned to the usage scenarios of the actual device. It may be conceivable that these values are entered by the user via the user interface.

It is further noted that the device may comprise a travel lock setting, wherein the device is manually switched to travel mode.

Figure 4:
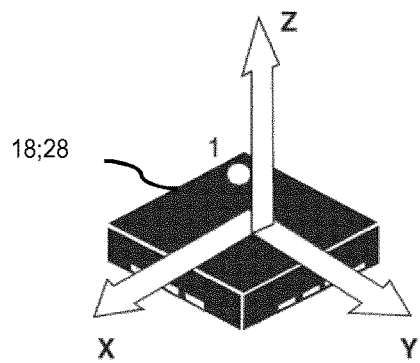
FIG. 4 shows a 3-axis accelerometer as an example of the orientation sensor shown in FIG. 3, FIG. 5 schematically shows an example of an electronic mobile device according to the invention when lying face-up (left side) and when oriented in a different orientation (right side), FIG. 6 schematically shows a 3-axis magnetometer as a further example of the orientation sensor shown in FIG. 3, FIG. 7 schematically shows, on the left side, an electronic mobile device according to the invention, when lying face up, and, on the right side, in a different orientation, FIG. 8 schematically shows a 3-axis gyroscope as a further example of the orientation sensor shown in FIG. 3, FIG. 9 schematically shows an electronic mobile device according to the invention and a differential angle measured by the 3-axis gyroscope of FIG. 8, FIG. 10 schematically shows an electronic mobile device according to the invention and some differential angles measured by the 3-axis gyroscope of FIG. 8.
Figure 5:
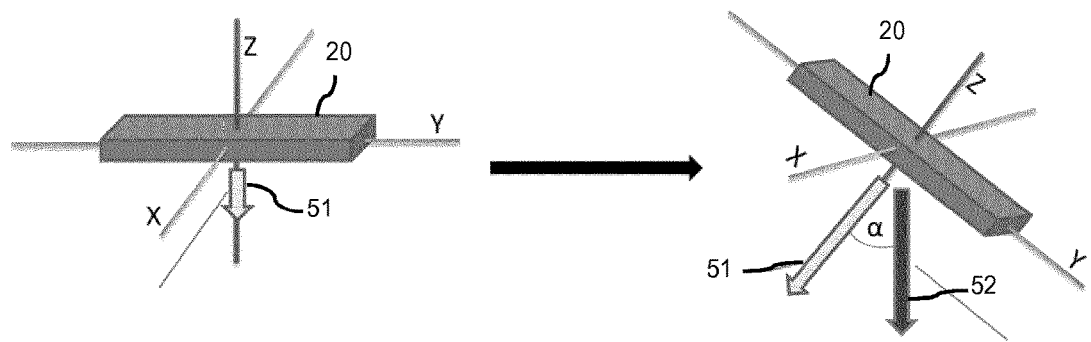

In an embodiment, the orientation sensor 18, 28 comprises a 3-axis accelerometer, see FIG. 4. This type of sensor is capable of measuring gravity as a 1 g static acceleration. Thus, the direction of gravity, and therefore the device orientation, can be determined by constructing a vector with the accelerometer X, Y and Z axis values as its components. This principle is shown in FIG. 5. On the left side of FIG. 5, the device 20 is shown lying face-up. The arrow 51 indicates the direction of gravity. The X, Y and Z axes shown correspond to the 3 accelerometer axes. When the device 20 boots up for the first time, the accelerometer is read and this initial set of readings is stored as the reference orientation. Device orientation changes, such as tilting the device, change the measured gravity direction, see arrow 52 on the right side of FIG. 5. When this happens, the angle between the stable and the current orientation vector can be determined by calculating the scalar product of these two vectors:

$$\alpha = \cos^{-1}\left(\frac{X_c X_s + Y_c Y_s + Z_c Z_s}{\sqrt{X_c^2 + Y_c^2 + Z_c^2}\sqrt{X_s^2 + Y_s^2 + Z_s^2}}\right)$$

Figure 6:
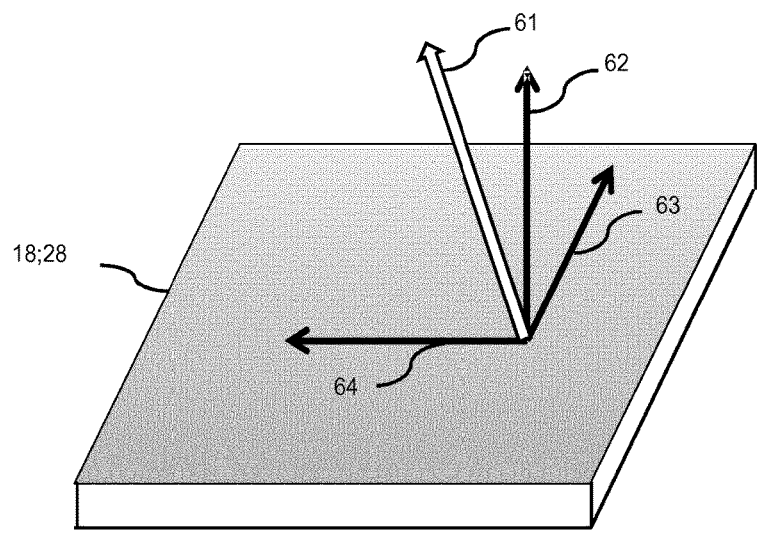

Where:
- $\alpha$=The angle between the two vectors
- $X_c$=The X component of the current vector
- $Y_c$=The Y component of the current vector
- $Z_c$=The Z component of the current vector
- $X_s$=The X component of the stable vector
- $Y_s$=The Y component of the stable vector
- $Z_s$=The Z component of the stable vector In another embodiment, the orientation sensor comprises a 3-axis magnetometer. This type of sensor is capable of measuring the strength and direction (in 3 dimensions) of magnetic fields. This includes measuring the earth's magnetic field. Therefore, using the sensor data, a 3D vector can be constructed which points to the magnetic north. FIG. 6 shows an example of the 3-axis magnetometer. In FIG. 6, an arrow 61 indicates the orientation of the device with respect to the magnetic north-, east and up directions. An arrow 62 indicates the magnetic "up (Z)" direction. An arrow 63 indicates the magnetic "East (X)" direction. An arrow 64 indicates the magnetic "North (Y)" direction.

Figure 7:
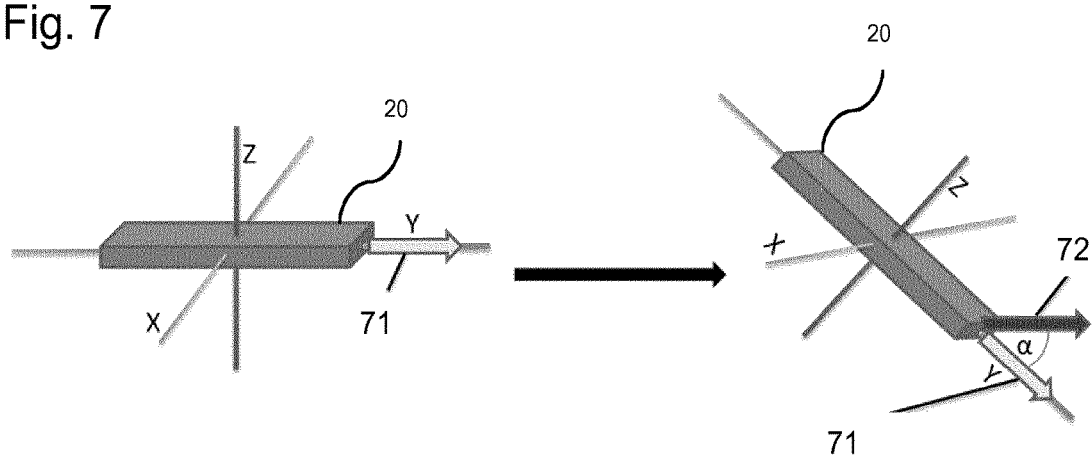

Therefore, the same approach as described for the accelerometer can be used to determine 3D orientation changes over time and to trigger a wake-up routine when an angular threshold is exceeded. This principle is shown in FIG. 7. FIG. 7 shows, on the left side, the device 20 lying face up. An arrow 71 indicates the earth's magnetic north direction, which in this example resembles a Y-axis of the sensor in the device 20. This direction will be stored as the reference orientation 71. Once the orientation is changed, see right side of FIG. 7, a differential angle α is present between the previous reference orientation 71 of the device 20 and the current orientation 72. An advantage of this embodiment is that there is virtually no drift in sensor readings. Furthermore, this type of sensor is not sensitive to shocks and vibrations.

Figure 8:
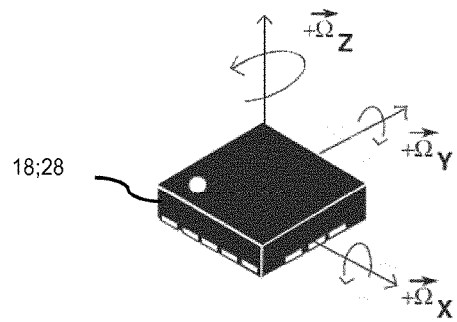

In yet another embodiment, the orientation sensor comprises a 3-axis gyroscope arranged to measure an angular rate along 3 axes. This type of sensor is capable of measuring rotational speed over 3 axes. Usually output is presented in the form of degrees per second or rotations per second. An example of such an orientation sensor 18, 28 is shown in FIG. 8. The 3-axis gyroscope 18, 28 is arranged to output data in degrees per second. With this type of sensor only orientation changes can be measured. The absolute orientation of the device 20 will not be known but is actually not needed to decide on waking up the device 20. A device wake-up is based on a change in orientation, and the actual absolute orientation is not needed.

In order to be able to extract the total amount of rotation around an axis over time, the output of the 3-axis gyroscope needs to be sampled frequently in order to make an accurate estimate. This sampling also needs to be done if the device 20 is in low-power mode. However, sampling the 3-axis gyroscope may use too much battery, which conflicts with the device being in low power mode. To solve this conflict, according to an embodiment, a minimum angular rate threshold is defined which needs to be measured on at least one of the 3 axes. If the angular rate is lower than this minimum angular rate threshold, the device 20 switches to a low sample rate in order to minimize power consumption. When the angular rate on at least one of the axes exceeds the minimum angular rate threshold, the device 20 wakes up and starts monitoring the angular rate. Converting the measured angular rate in degrees per second to an actual angle change in degrees may be performed using:

$$\text{Angle} = \frac{\text{Angular rate}}{\text{Time}}$$

Where:
Angle is the differential angle in degrees
Angular rate is the rate of change in degrees per second
Time is the amount of time in seconds the angular rate has been measured.

For example, if the measured angular rate is 10 degrees per second and this rate is measured during 2 seconds, the actual angular change is 10*2=20 degrees. The accuracy of the measurement depends on the chosen sample rate because changes in angle rate occurring between sensor samples will not be measured. Therefore, a low sample rate results in a relatively low accuracy but energy is saved and the device may stay in the low-power mode.

The angle changes measured by the 3 axis gyroscope of FIG. 8 may be converted into a wake-up/sleep decision using 2 different methods. The device may be woken up when the angle change on at least one of the 3 axes exceeds a threshold. This first method is computationally inexpensive. It is expected to deliver adequate performance for this type of application. Alternatively, the angle change of all 3 axes may be combined to construct a 3D vector and, next, an angle between the 3D vector and an initial reference vector may be calculated. This second method is similar to the method used in the embodiment with the accelerometer of FIG. 4. The second method requires a fair amount of processing power but combines the results of all three axes to decide if a wake-up is needed. It is therefore more generic than the first method.

Figure 9:
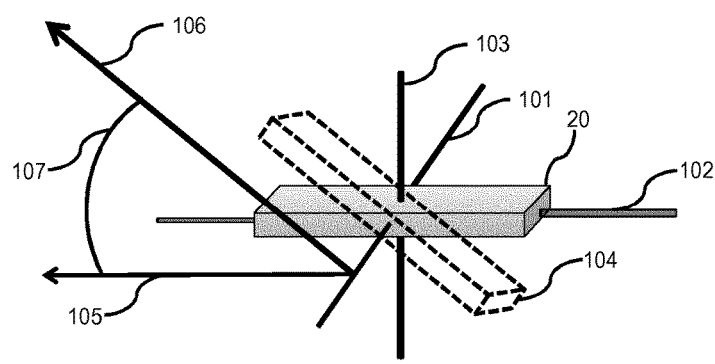

FIG. 9 shows the principle of the first method. A box 20 represents the registered reference orientation of the body of the device 20. Axis 101 represents the orientation sensor X axis of the device. Axis 102 represents the orientation sensor Y axis of the device. Axis 103 represents the orientation sensor Z axis of the device. A box 104 represents the current orientation of the body of the device. Arrow 105 represents the orientation vector of the registered reference orientation of the device. Arrow 106 represents the orientation vector of the current orientation of the device. Angle 107 represents the measured differential angle between the registered reference orientation vector and the current orientation vector.

Figure 10:
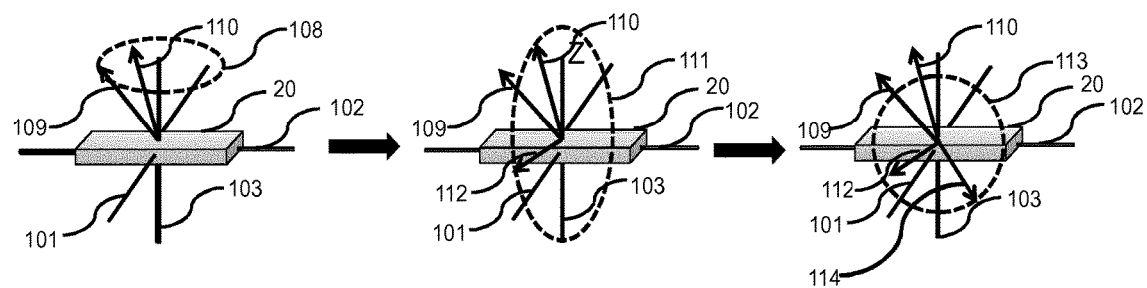

FIG. 10 shows the principle of the second method. On the left side, FIG. 10 shows how a reference vector can be rotated over 3 axes based on the calculated orientation changes in order to construct a reference vector. The differential angle between the reference vector and the rotated vector can then be used to determine the actual change in orientation. Shape 20 represents the body of the device. Axis 101 represents the X axis of the gyroscope. Axis 102 represents the Y axis of the gyroscope. Axis 103 represents the Z axis of the gyroscope. Circle 108 represents the rotation about the Z axis. Arrow 109 represents the reference vector. Arrow 110 represents the reference vector rotated about the Z axis. Circle 111 represents the rotation about the Y axis. Arrow 112 represents the reference vector rotated about both the Z- and Y axes. Circle 113 represents the rotation about the X axis. Arrow 114 represents the reference vector rotated about the Z, Y and X axes. The angle between this vector and the reference vector is used to determine if the device needs to be woken up or not.

Advantages of the use of the 3-axis gyroscope are that such a sensor is capable of measuring rapid changes in rotational speed along its axes and that the sensor is immune to shocks and vibrations.

According to an aspect of the invention, there is provided a method of switching an electronic mobile device from a high-power mode into a low-power mode and vice versa. The method comprises: repeatedly receiving a current orientation of the device from an orientation sensor of the mobile device. A new reference orientation is periodically set to the current orientation. This new reference orientation may be registered by the processor 6 (see FIG. 3) in a memory of the device 20. Next, a differential angle is calculated between the current orientation and the new reference orientation. Then the calculated differential angle is compared to a predefined angular threshold. If the calculated differential angle is above the predefined angular threshold, the device is switched from the low-power mode to the high-power mode.

Figure 11:
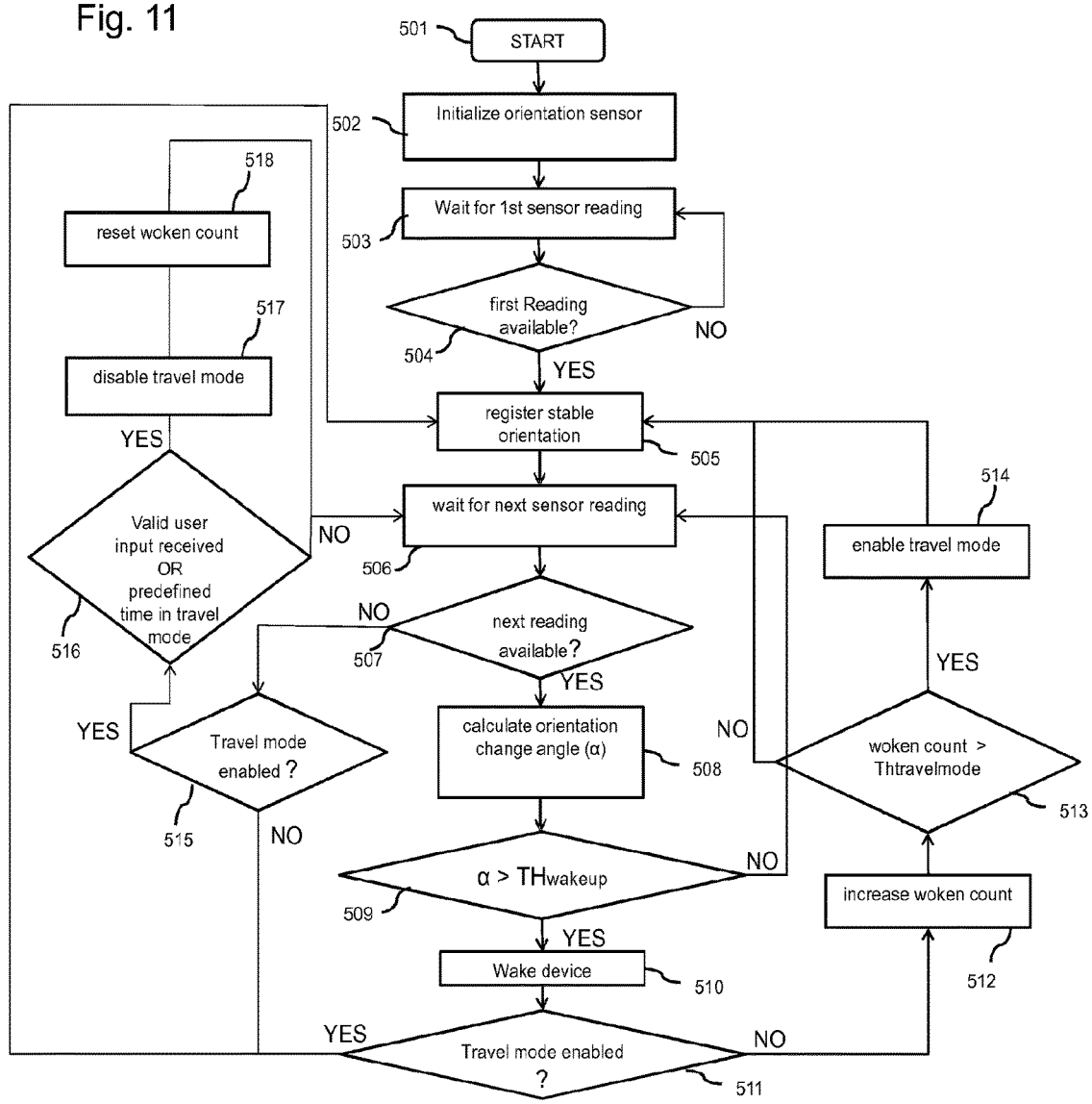
FIG. 11 shows a flowchart of an embodiment of the method according to the invention of switching an electronic mobile device from a low-power mode into a high-power mode.

FIG. 11 shows a flowchart of a method of switching an electronic mobile device from a low-power mode into a high-power mode according to an embodiment of the invention. This method may be performed by a processor arranged in the mobile electronic device 20. The method may start, see step 501, when the device 20 boots up for the first time. After the start 501, the orientation sensor is initialized, see step 502. Then the processor waits for a first sensor reading, see step 503. If a reading is available, see test 504, the (new) reference orientation is registered, see step 505, for example by temporarily storing a value of the measured current orientation into a memory. Next, in a step 506, the processor waits until a next sensor reading is available, see 507. When a next reading is not available, test 515 checks if the travel mode is enabled. If the result is NO, step 506 will again be executed. If the result is YES, test 516 is executed. This test checks if one of the following two conditions are true:
The device has been in travel mode for a predefined time
Valid user input has been received
If the result of test 516 is TRUE, step 517 is executed in which the travel mode is disabled. If the result of test 516 is FALSE, step 506 follows. After step 517, step 518 is executed, in which the "woken count" is reset. After step 518, step 506 follows again. If a next reading is available, a step 508 follows in which a differential angle α is calculated representing an orientation change, see 508. Next, it is tested in test 509 if the differential angle α is larger than a predefined angular threshold value. If the result of test 509 is true, a step 510 follows in which the device is woken up, i.e. switched to the high-power mode. If the result of test 509 is false, a step 506 follows in which the algorithm waits for the next sensor reading. After step 510, it is tested if the travel mode is enabled, see 511. If the result is YES, step 505 follows and the measured current orientation is registered as the new reference orientation. If the result in test 511 is NO, a step 512 follows, in which a counter called 'woken count' is increased. Increasing may be done in incremental steps of one. Next, in a test 513, the woken count value is compared to a so-called 'travel mode threshold'. If the woken count is larger than the travel mode threshold, the travel mode is enabled, see step 514. Now the device will be in travel mode, which is a low-power mode of the device different from the sleep mode. The main difference between the sleep mode and the travel mode is the value for the angular threshold value used in test 509. In an embodiment, the angular threshold value in the travel mode is larger than the angular threshold value in the sleep mode. This results in the device being less sensitive to orientation changes when being in the travel mode. After switching to the travel mode, the reference orientation is again registered, see step 505.

If the result of test 513 is NO, the device stays in sleep mode and step 505 follows. In an embodiment, the device is switched from the travel mode back into the sleep mode if the device has been in travel mode for a predefined maximum travel time. For example, if the device has been in travel mode for e.g. 2 hours, the processor 6 decides to switch the device into sleep mode so that the device is more sensitive to orientation changes and will easily wake up when the user picks up the device. So, the processor in this case expects a travel to last for about two hours. It is noted that the setting of the maximum travel time may be optimized depending on the particular application. It may also be entered by the user via a dialogue on a screen of a user interface of the device.

In the above-described embodiments, the device is switched from a low-power mode to a high-power and vice versa. Instead of a low-power and a high-power mode, the device can be switched between first and second operational modes other than low-power and high-power modes. For example, the device could be switched between two modes which both use about the same amount of energy.

It is noted that in this document the word 'comprising' does not exclude the presence of elements or steps other than those listed and the word 'a' or 'an' preceding an element does not exclude the presence of a plurality of such elements, and that any reference signs do not limit the scope of the claims. Further, the invention is not limited to the embodiments, and the invention lies in each and every novel feature or combination of features described above or recited in mutually different dependent claims.

The invention claimed is:

1. An electronic mobile device comprising:
    a device mode control unit configured and arranged to switch the mobile device from a first operational mode into a second operational mode and vice versa;
    an orientation sensor configured and arranged to measure a current orientation of the mobile device;
    a processor configured and arranged such that, during operation of the mobile device, the processor:
        receives the current orientation from the orientation sensor and stores the received current orientation as a reference orientation of the mobile device,
        periodically receives the current orientation from the orientation sensor, periodically calculates a differential angle between the current orientation and the stored reference orientation, and periodically compares the differential angle with a predefined angular threshold value, and
        instructs the device mode control unit to switch the mobile device from the first operational mode to the second operational mode if the differential angle is above the predefined angular threshold value,
    wherein a frequency of said periodically receiving the current orientation, periodically calculating and periodically comparing the differential angle is in a range from 5 to 15 Hz, and in that the processor is configured and arranged such that, during operation of the mobile device, the processor periodically receives the current orientation from the orientation sensor and periodically stores the received current orientation as the reference orientation with a frequency in a range from 0.25 to 0.5 Hz.

2. Electronic mobile device according to claim 1, wherein the first operational mode is a low-power mode and the second operational mode is a high-power mode.

3. Electronic mobile device according to claim 2, wherein the processor is configured and arranged such that, in the low-power mode of the mobile device, the processor distinguishes between a sleep mode and a travel mode, wherein, if the mobile device is switched from the sleep mode to the high-power mode a predefined number of times during a predefined time period without registering any user interaction, the processor instructs the device mode control unit to switch the mobile device into the travel mode.

4. Electronic mobile device according to claim 3, wherein, in the sleep mode, the predefined angular threshold value is smaller than in the travel mode.

5. Electronic mobile device according to claim 4, wherein, in the sleep mode, the predefined angular threshold value is in a range of 10 to 15 degrees and, in the travel mode, the predefined angular threshold value is in a range of 60 to 65 degrees.

6. Electronic mobile device according to claim 1, wherein the predefined angular threshold value is in a range from 10 to 15 degrees or in a range from 60 to 65 degrees.

7. Electronic mobile device according to claim 1, wherein the processor is configured and arranged such that, during operation of the mobile device, the processor stores the received current orientation as the reference orientation when the mobile device is switched from the first operational mode to the second operational mode.

8. Electronic mobile device according to claim 3, wherein the processor instructs the device mode control unit to switch the mobile device from the travel mode into the sleep mode if the mobile device has been in travel mode for a predefined maximum travel time.

9. Electronic mobile device according to claim 1, wherein the orientation sensor comprises a 3-axis accelerometer.

10. Electronic mobile device according to claim 1, wherein the orientation sensor comprises a 3-axis magnetometer.

11. Electronic mobile device according to claim 1, wherein the orientation sensor comprises a 3-axis gyroscope configured and arranged to measure an angular rate along 3 axes.

12. Electronic mobile device according to claim 11, wherein the processor is configured and arranged such that, during operation of the mobile device, the processor switches a sample rate of the orientation sensor between a relatively low sample rate and a relatively high sample rate, wherein the processor switches the sample rate to the relatively low sample rate if a measured angular rate on at least one of the 3 axes is lower than a minimum angular rate threshold, and wherein the processor switches the sample rate to the relatively high sample rate if the measured angular rate on at least one of the 3 axes is higher than the minimum angular rate threshold.

13. Electronic mobile device according to claim 1, wherein the mobile device is a personal care device, a mobile communication device, a mobile media player, a phablet or a mobile computing device.

14. Method of switching an electronic mobile device from a first operational mode into a second operational mode and vice versa, the method comprising:
    receiving a current orientation of the mobile device from an orientation sensor of the mobile device and storing the received current orientation as a reference orientation of the mobile device;
    periodically receiving the current orientation from the orientation sensor, periodically calculating a differential angle between the current orientation and the stored reference orientation, and periodically comparing the differential angle with a predefined angular threshold value; and
    switching the mobile device from the first operational mode to the second operational mode if the differential angle is above the predefined angular threshold value, wherein a frequency of said periodically receiving the current orientation, periodically calculating and periodically comparing the differential angle is in a range from 5 to 15 Hz, and in that the method comprises periodically receiving the current orientation of the mobile device from the orientation sensor and periodically storing the current orientation as the reference orientation with a frequency in a range from 0.25 to 0.5 Hz.

15. A computer program product comprising instructions for causing a processor system to perform a method according to claim 14.

* * * * *